Nov. 5, 1946.   G. M. DARBY   2,410,637
HYDRAULIC SIZER FOR SUSPENDED SOLIDS
Filed June 23, 1944
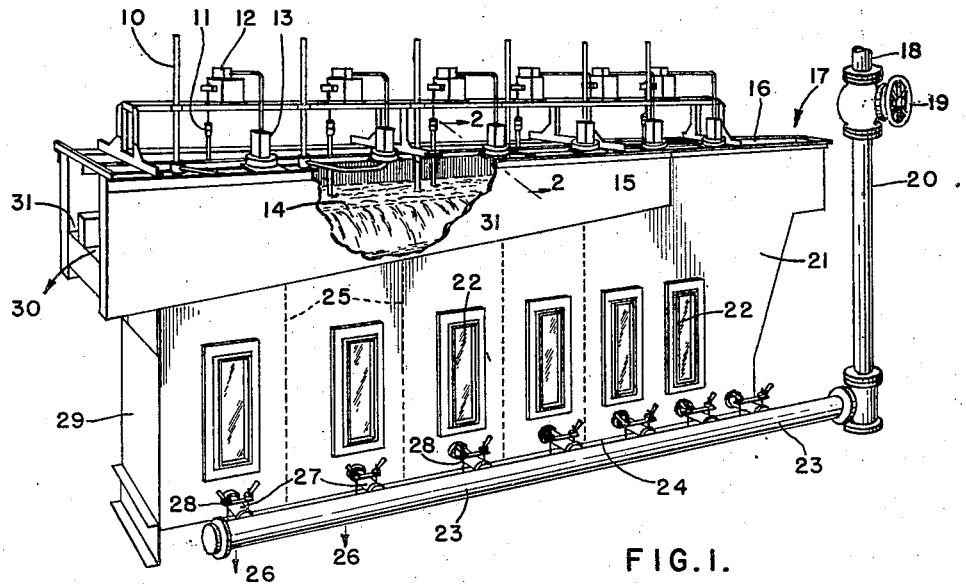
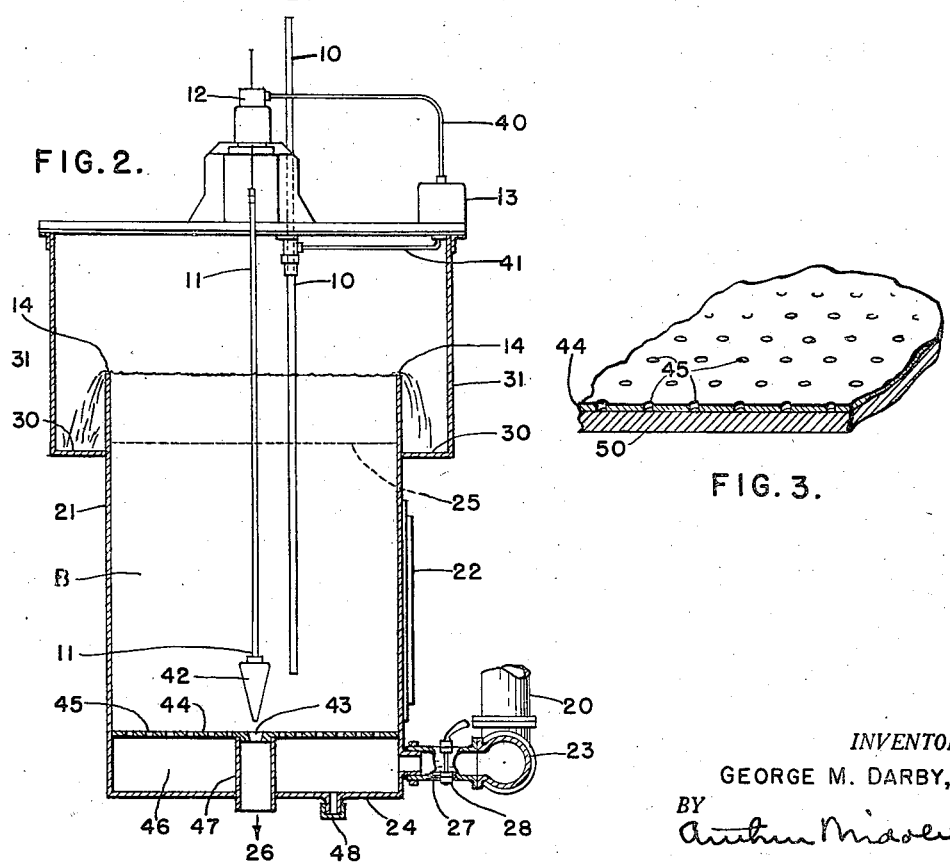
INVENTOR:
GEORGE M. DARBY,
BY
ATTORNEY Patented Nov. 5, 1946

2,410,637

UNITED STATES PATENT OFFICE 2,410,637

HYDRAULIC SIZER FOR SUSPENDED SOLIDS

George M. Darby, Westport, Conn., assignor to The Dorr Company, New York, N. Y., a corporation of Delaware Application June 23, 1944, Serial No. 541,760

5 Claims. (Cl. 209—454)

This invention relates to the sizing or classifying of suspended solids to separate them into groups or fractions according to particle size, with a minimum of both under-size or over-size in each fraction. More particularly, the invention is applicable to the treatment, in this manner, of particles of minute sizes where differences of micron accuracy are important, as exemplified in the sizing of very fine abrasives.

This invention proposes to make use of hindered settling in a pool or bath of suspended solids that are in teeter due to hydraulic water being passed upwardly through such a bed through a constriction or orificed plate that lies beneath the bed. Feed material is continually passed to the bath, and finely sized solids are continually overflowed therefrom, while the coarser solids are discharged from the bottom of the bath. Since the density of the feed material may vary somewhat, and as the maintenance of a controlled density of the bath is important, means are made use of which automatically control the density of the bath to maintain it practically constant. In such an environment, the invention has for its object the provision of a constriction plate coupled with the flow of hydraulic water or other classifying liquid; under conditions to maintain the bath of suspended solids being classified with a certain void ratio that assures the maintaining of all of the suspended solids being classified in teeter and thoroughly mobilized so that substantially none can come to rest on the constriction plate.

The velocity of the hydraulic water passed upwardly through the orificed constriction plate controls the dividing line of particle size below which particles are swept upwardly from the teetered bed by the hydraulic water flowing therethrough and overflow from the apparatus, while those particles that are larger than that size descend against the upflowing water and are discharged from the bottom of the bed. Therefore, one function of the velocity of the hydraulic water flowing through the plate is to control the line of division of particle size. But a feature of operation of this invention is that not only must the velocity of the hydraulic water be controlled (which is well known) but the volume must be controlled in order to maintain the void ratio of water on the one hand to water and solids on the other hand so that the volume of the water present in the bed is not less than .60 of the volume of water and solids present.

It is the velocity of the hydraulic water passing upwardly through the orificed constriction plate that controls the size separation. Where the particles to be so sized or fractionated into groups of sized particles are of screen-mesh sizes, the velocity is substantial which means that the diameter of the orifices in the constriction plate are of appreciable size. But, when it comes to sizing particles where the difference between the particles to be overflowed and those particles to be discharged through the bottom differ by say a few microns, then two troubles are encountered. First, it is impracticable to drill holes small enough in the constriction plate, and second, however small the holes are that can be drilled, they are so large relative to the solids that the descending solids being as small as they are, pass through the orifices in the plate which they should not do. Therefore, an important object of this invention is to solve this problem.

The problem is solved by using a composite constriction plate with orifices in one section thereof as small as can be conveniently drilled therethrough and then beneath is disposed a diffusion or dispersion section of pervious material, such as porous tile. Tile alone cannot be used because too much water will go through it and the water that does pass therethrough cannot be concentrated in spots as is necessary in a constriction plate. So the net result is that all the benefits of the constriction plate can be enjoyed using larger orifices than otherwise, but solids cannot pass downwardly through the orifices because they are blocked by the tile that is in close subjacent contact with the plate. Thus, this composite water-controlling partition has the attributes of avoiding the necessity of too fine orifices; of preventing descent of solids through the larger orifices used; and of reducing the velocity through the larger orifices due to the diffusing and flow-retarding action of the previous section of the plate.

The best embodiment of this invention now known, is shown in the accompanying drawing but it is to be understood that form is used for illustrative purposes only, for obviously the invention is capable of other manifestations. For instance, the invention may be practiced in a single pocket classifier or sizer.

In the drawing, Figure 1 is a perspective view of a multi-pocket sizer embodying this invention. Fig. 2 is a transverse vertical sectional view taken along the line 2—2 of Fig. 1, looking toward the feed end of the apparatus. This illustrates how a representative pocket is made and how it works, either as a complete unit or as one of a number of such pockets in a machine like that of Fig. 1.

Fig. 3 is a partial vertical sectional view of an enlarged detail of the composite constriction plate of this invention.

Referring to Figure 1, for the moment, 21 indicates a tank having a bottom 24, with the tank being narrower at the inlet end 16 where feed 17 enters, and wider at the other end 29 from which overflow 30 discharges. The tank is divided into pockets having submerged divisional walls 25, shown in dotted lines, and there is a sight-glass 22 for each pocket. Each pocket has an overflow weir-edge 14 over which liquid overflows from the pocket into a side launder 31 which slopes as shown toward the overflow end 30. 18 indicates a pipe for conducting hydraulic liquid such as water to each pocket through the valve 19, the pipe 20 and the manifold 23. From the manifold 23, there is a branch pipe 27 leading to each pocket, controlled by a pinching valve 28 for controlling the volume and velocity of hydraulic liquid passing from the manifold into each pocket. 26 represents a sands discharge from each pocket.

Each pocket is also provided with a super-elevation indicator 10, a discharge valve-stem 11, a motor operator 12 for the valve-stem, and a diaphragm-equipped controller 13 for the motor. Each pocket is greater in width successively as it is more distant from the feed inlet 17, but all are of equal depth.

Referring now to Fig. 2, the motor controller 13 is wired to the motor operator 12 through a conduit 40, and the super-elevation indicator pipe 10 is connected with the controller 13 by means of a pipe 41. The valve-stem or rod 11 is connected with a conical valve 42 that is adapted to close the valve seat 43 located in a constriction plate 44 that is provided with orifices 45. Between the constriction plate and the bottom 24 of the tank is formed a hydraulic liquid chamber 46 fed with such liquid through pipe 27, with its valve control 28 leading from the manifold 23. When unseated, the valve 42 permits suspended solids from the bath or bed B thereof in the pocket to pass out therefrom through the conduit 47 to discharge as 26. 48 indicates a drain plug for the hydraulic chamber 46. This construction and its operation is shown and described in the U. S. A. patent application of Haagensen, Serial No. 501,841.

The operation thereof may be briefly described as follows: there is an ever-changing pool, bed or bath B of suspended solids in the pocket, passing from one pocket to a next succeeding one over the submerged partition 25 between adjacent pockets. Hydraulic liquid, such as water, is supplied to the bath through the manifold 23 and pipe 27 into the hydraulic chamber 46 from whence it flows upwardly through the constriction plate 44 at a velocity and in a volume sufficient to maintain the suspended solids in the bath thoroughly mobilized and in teeter. The velocity of the upflowing hydraulic water determines the particle size less than which particles overflow the weir edge 14 into the launders 31 and flow to discharge as fines. Particles of a size larger than those desired to overflow, descend and pass out from the bed or bath B through the valve-seat 43 (the valve 42 being normally unseated) and the conduit as discharged sands.

However, the efficiency of this classification of particles into an overflowed fraction of fines and into a discharged fraction of sands, depends upon maintaining constant the density of the bath. This is done in the practice of the Haagensen invention by controlling the valve 42 automatically to maintain the density of the bath constant, irrespective of fluctuations in the rate of feed, or other variables that affect density. If the density of the bath rises, the column of clear water in the super-elevational tube 10 that is balanced by the bath of suspended solids, rises above the fixed liquid level of the bath, to an elevation high enough to flow through the pipe 41 into the controller 13 where pressure thereof presses upon a diaphragm (not shown) whose consequent movement operates an electrical circuit that starts motor-operator 12 to raise or unseat the valve 42 from its seat 43 and let out enough sands until the density falls back to normal. When this happens, the column of clear water in the pipe 10 falls back to normal, the motor-controller 13 returns to normal, and this in turn stops the motor 12 to leave the valve just enough off its seat to provide proper discharge of sands through the valve seat 43. Thus, the valve is normally open and off its seat, but as density rises, the valve is raised further off its seat, and if the density gets too low, the valve is seated until the correct operating density is restored. The classified fines continue to overflow the weir edge continually, while the sands continually discharge through the pipe 47, except when the valve is actually seated—which is rare. However, the discharge of sands may fluctuate in quantity depending upon the distance that the valve is off its seat, as a result of its operation by the motor 12. The valve may be said to go through a hunting action of rising and falling when the density changes, but minutes or sometimes hours may go by without the valve changing its position, if the density is not disturbed by fluctuations in quantity of feed, or its density.

However, where it is important to realize the advantage of accuracy of sizing, toward which the emphasis of this invention is directed, attention should be paid to assuring that the suspended solids in the bed, bath or pool be maintained in mobilized condition with substantially none of them at rest. In order to assure a still further specific optimum condition of teeter, there must be established and maintained a relationship within the bath, which is a pulp or mixture of solids and liquid, whereby the volume of the liquid present bears a particular ratio to the total volume of the liquid and solids of the pulp. Such ratio is that the volume of liquid present should equal 60% of the total volume of the liquid and solids present, in which case the volume of suspended solids will equal 40% of the total volume of liquid and solids. The ratio of the volume of liquid to total volume of liquid and solids may rise as high as 90%, but 60% is critical and a less percentage should be avoided, if possible. Latitude is allowed up to 90% but as the percentage rises above 60% decreased efficiency is experienced. This percentage of liquid may be referred to as "void ratio," namely the ratio of space occupied by non-solids compared with the space taken up by the liquid-solids mixture or pulp. It is expedient for calculation purposes, however, to use decimals rather than percentages; so we may say that the "void-ratio" should be .60 of the volume of the pulp (the solids ratio being .40 of the volume of the pulp), although latitude is permitted up to .90 of the volume of the pulp (with the solids ratio .10). Therefore, void ratio is that figure obtained by dividing the volume of the liquid by the volume of the pulp or bath. For example, a void ratio of .60 (solids ratio .40 with 3.2 specific gravity solids would give a specific gravity pulp of 1.88 if taken just above the bottom of the pulp or bath. The calculation thereof is as follows: 3.2 times .40 (ratio of solids) equals 1.28. To this is added .60 which is the sum of the specific gravity of water (1.00) times the .60 ratio. Thus 1.28 plus .60 equals the specific gravity of the pulp, namely 1.88. With a void ratio of .70 (solids ratio .30) the calculation is: 3.2 times .30 (ratio of solids) equals .96. The specific gravity of water (1.00) times the ratio of voids (water) .70, equals .70. .96 plus .70 equals 1.66 the specific gravity of the pulp—at the bottom of the bath thereof. If a liquid other than water is made use of, naturally the specific gravity thereof should be used in the calculations instead of that of water. As the specific gravity of the solids fed to the bath is reasonably constant, after the first setting of the feed of water to the bath, only an occasional sampling of the specific gravity of the bath or pulp needs to be taken, and the water feed rate adusted, if the void ratio is out of line, as shown by such sampling.

But even when such care is exercised in maintaining proper conditions of teeter, the accurate sizing or classifying of extremely small solids, such as abrasives, presents another problem, namely the orifices 45 in the constriction plate 44, of Fig. 2, cannot be drilled small enough to prevent the fine descending solids from settling against the upflowing hydraulic water and down through the orifices 45 into the hydraulic chamber 46. In other words, the foregoing "void ratio" can be made to operate in classifying solids according to screen mesh sizes, but when classification is attempted of solids differing in diameter by only a few microns, then a new trouble is encountered.

That trouble is solved in the practice of this invention by making the orificed constriction plate 44 of Fig. 2, in complex or composite form, along the lines illustrated in Fig. 3, wherein metallic plate 44 is orificed by having holes 45 drilled therethrough at appropriate intervals, but attached to the metal plate 44 subjacent thereto is a pervious liquid-diffusing or dispersing section or layer 50 of porous tile or other pervious material. By such an arrangement, the orifices need only be as small as they can be made conveniently, for any setting solids that might be small enough to pass downwardly through the orifice cannot do so because it cannot pass through the porous tile 50. At the same time, the hydraulic liquid, such as water, is controlled as to volume and velocity just as well with this type of composition constriction plate as with a simple type. However, in order to get the control necessary, it is important that the orificed metal plate be on top or above the pervious plate or tile, and not vice versa. By the use of the combination described and claimed herein, suspended solids can be classified into fractions differing by as little as five microns in diameter, and solids of twenty microns diameter can be separated from solids of fifteen microns in diameter.

The pervious tile is preferably of the type now on the market called "Porex," and the tile when ¼" thick has proven satisfactory. Standard flow velocity through such a tile is 57 feet per hour. This velocity is too great when classifying micron sizes of solids so the size of the orifices in the metal plate and the center-to-center spacing thereof is arranged to cut down the velocity of the hydraulic water passing therethrough to that required by the size classification or fractionation to be effected. Other constriction plates can be used so long as the pervious layer or section is liquid diffusing and has pores so small that solids will not pass therethrough, while the upper layer is orificed with liquid impervious blank areas between the orifices. Another type of such plate is a metal or metallized plate having small discs of pervious material seated therein through which hydraulic liquid can flow upwardly.

As explained in the earlier part of this specification, the maximum accuracy of this apparatus is not realized unless the void ratio, namely the ratio of the volume of non-solids, is maintained at between .60 and .90 of the total volume of the pulp or bath, it being understood that the greatest efficiency is experienced when the void ratio is as close to .60 as is possible to maintain. If this cannot be maintained, then the operator should err on the side about .60 up to .90, but should try to avoid going substantially below .60.

This void ratio determines the condition of efficient teeter within the bath and is a separate feature of control from the complex or composite constriction plate of Fig. 3, but this condition of void ratio contributes importantly to the conjoint operation of the particular constriction plate. Therefore, the hydraulic water fed through pipe 27 into the hydraulic chamber 46, has a double requirement, namely, it must be sufficient in velocity as it passes upwardly through the composite constriction plate 44 to bring about the particle size separation or classification desired, but it must also be in volume sufficient to maintain the critical void ratio in the bath.

I claim:

1. Apparatus for the sizing of suspended solids, comprising means for establishing and maintaining a pool of suspended solids to be classified by hindered settling, means for continually feeding solids thereto, means for continually discharging fractionated larger solids from the bottom of the pool, means for continually overflowing from the upper section of the pool another fraction of smaller solids, means forming a bottom for the pool including an upper horizontally extending flat plate of impervious material having orifices for distributively delivering controlled quantities of water upflowing therethrough under pressure and a lower immediately underlying porous tile downwardly through the pores of which fine solids cannot pass but upwardly through which pores water can be passed for delivery through the orifices of the plate under hydraulic pressure to mobilize suspended solids in such pool, means for controlling the liquid supplied to the pool so that the ratio of the volume of liquid of the pool to the total volume of the liquid and solids content of the pool is maintained at not substantially less than .60 but which may be as great as .90, means for establishing and maintaining a column of clean liquid balanced by the density of the pool to a super-elevation above the top of the pool which super-elevation varies with the density of the pool due to fluctuating feed thereto of solids, a valve-seat in the bottom of the pool, an adjustable valve controlling the rate of discharge of the solids fraction through the valve seat, and automatic means for stabilizing the density of the pool at or near a predetermined normal to ensure accurate size classification of solids therein.

2. Apparatus for the sizing of suspended solids, comprising means for establishing and maintaining a pool of suspended solids to be classified by hindered settling, means for continually feeding solids thereto, means for continually discharging fractionated larger solids from the bottom of the pool, means for continually overflowing from the upper section of the pool another fraction of smaller solids, means forming a bottom for the pool including a horizontally extending member having orificed portions providing apertures disposed for insuring delivery of controlled quantities of water passing upwardly therefrom and at the underside of said member in the region immediately below and extending outwardly beyond the lower edge of the aperture of each orificed portion a porous tile section through which fine solids cannot downwardly pass but through the pores of which hydraulic water is passed into and for delivery from the aperture of the corresponding orificed portion under hydraulic pressure to mobilize suspended solids in such pool, means for establishing and maintaining a column of clean liquid balanced by the density of the pool to a super-elevation above the top of the pool which super-elevation varies with the density of the pool due to fluctuating feed thereto of solids, a valve seat in the bottom of the pool, an adjustable valve controlling the rate of discharge of the solids fraction through the valve seat, and automatic means for stabilizing the density of the pool at or near a predetermined normal to ensure accurate size classification of solids therein.

3. Apparatus according to claim 2, wherein the orificed member comprises a porous tile section farthest from the pool and thereabove facing the pool a metal section provided with orifices and blanked off areas of metal therebetween.

4. Apparatus according to claim 2, wherein the orificed member has one section pervious both to upflowing water and to descending suspended solids, and another section pervious to such water but not to such solids.

5. Apparatus for the sizing of suspended solids, comprising means for establishing and maintaining a pool of suspended solids to be classified by hindered settling, means for continually feeding solids thereto, means for continually discharging fractionated larger solids from the bottom of the pool, means for continually overflowing from the upper section of the pool another fraction of smaller solids, a composite flow-constriction floor member embodying as an upper portion thereof a plate of impervious material having spacedly disposed throughout the same upflow-openings and as a contacting lower layer a porous tile impervious to the downward passage of fine soldis but pervious to hydraulic water into, through, and directly from the pores of which the water passes into said upflow openings for upward distributive delivery under pressure into the overlying pool whereby to mobilize suspended solids in the pool, means for establishing and maintaining a column of clean liquid balanced by the density of the pool to a super-elevation above the top of the pool which super-elevation varies with the density of the pool due to fluctuating feed thereto of solids, a valve seat in the bottom of the pool, an adjustable valve controlling the rate of discharge of the solids fraction through the valve seat, and automatic means for stabilizing the density of the pool at or near a predetermined normal to ensure accurate size classification of solids therein.

GEORGE M. DARBY.